UNITED STATES PATENT OFFICE.

FRIEDRICH GEROMONT, OF WINKEL, ASSIGNOR TO C. F. BOEHRINGER & SOEHNE, OF WALDHOF, NEAR MANNHEIM, GERMANY.

LACTYL-PARAPHENETIDID AND PROCESS OF MAKING IT.

SPECIFICATION forming part of Letters Patent No. 503,743, dated August 22, 1893.

Application filed July 21, 1892. Serial No. 440,804. (Specimens.)

*To all whom it may concern:*

Be it known that I, FRIEDRICH GEROMONT, a subject of the German Emperor, residing at Winkel-in-the-Rheingau, Hesse Nassau, Prussia, Germany, have invented certain new and useful Improvements in the Art of Obtaining Lactyl Derivatives of Paraphenetidin; and I do hereby declare the following to be a full, clear, and exact description of the invention, such as will enable others skilled in the art to which it appertains to make and use the same.

This invention relates to the manufacture of lactyl-paraphenetidid. This lactyl-derivative possesses certain valuable properties viz: antineuralgic and antifebrile.

The invention consists in heating the lactate of paraphenetidin to 130° to 180° centigrade, until the watery vapors resulting therefrom are completely driven off, when the lactyl-derivatives will be formed. This heating process is not merely for the purpose of desiccation or drying and driving off the moisture and water of crystallization, but its effect is more radical in its nature, inasmuch as it produces a decomposition of the lactate of paraphenetidin, splitting the same up into the anhydride, lactyl-paraphenetidid and water, which escapes as steam in the further progress of the heating. This reaction is shown by the following equation:

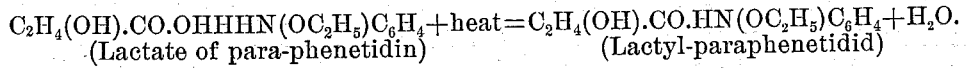

$$C_2H_4(OH).CO.OHHHN(OC_2H_5)C_6H_4 + heat = C_2H_4(OH).CO.HN(OC_2H_5)C_6H_4 + H_2O.$$
(Lactate of para-phenetidin)      (Lactyl-paraphenetidid)

This splitting up of the molecule of lactate of paraphenetidin forms one of the most essential features of my invention. This lactyl-derivative may be also obtained of course, by heating the aforesaid base with lactic anhydride, with lactide, or with lactic esters to the temperature of 130° to 180° centigrade. It is produced most advantageously by proceeding as follows:

Example: Twenty-seven kilograms of paraphenetidin are dissolved in an equivalent quantity of dilute sulfuric acid of 20° Baumé and mixed with a hot or cold aqueous solution of thirty kilograms of lactate of calcium. $(Ca(C_3H_5O_3)_2 + 5H_2O.)$ Strong alcohol is added to this mixture until the resulting sulfate of calcium has been completely precipitated, *i. e.*, until a sample-filtrate will not become turbid by the further addition of alcohol. By filtering, the solution of lactate of paraphenetidin is separated from the sulfate of calcium and the alcohol contained in the solution may then be recovered by (re) distillation. By evaporation, the water of solution is then eliminated and the residue, consisting of lactate of paraphenetidin, is gradually heated to above the boiling point and preferably to 180° centigrade, until no more aqueous vapors escape from the fused mass. When this occurs, a molecule of water has been completely separated from each molecule of the lactate of paraphenetidin, thus converting it into my new compound, the lactyl-paraphenetidid. The lactyl compound so obtained after being cooled to about 100° centigrade, is then dissolved in boiling water, to which some animal charcoal may be added for decoloration. From the clear filtered solution the greatest portion of lactyl-paraphenetidid is separated in crystals, while the remainder may be obtained from the solution by evaporation.

It is manifest that other metallic lactates, such as lactate of zinc, for example, may be employed in lieu of lactate of calcium in the described process. Likewise instead of sulfuric acid solution of the aromatic base, solutions of the same in other mineral or organic acids—such as oxalic, tartaric acid, &c.—may be employed, the essential feature being that a molecule of water is split off from the lactate of paraphenetidin. Should the metal salt resulting from the double decomposition be soluble in alcohol, the lactate of the aromatic base may be best removed from the mixture by ether and further treated after distilling off the ether.

By the described process the lactyl derivatives of paraphenetidin are obtained in quantities which approximate very closely to the theoretical yield.

The lactyl-paraphenetidid has the formula $$C_6H_4(OC_2H_5)NHCOC_2H_4OH = C_{11}H_{15}NO_3$$

and crystallizes readily in white needles and melts at 117.5° centigrade, and is soluble in two hundred and fifty-five times its quantity of water of 30° centigrade and four hundred and thirty-five times its weight of water at 20° centigrade, and very soluble in alcohol. It is administered in the form of a powder and in doses of from 0.5 to one gram.

While I consider the process as set forth above in illustration of my invention the preferable manner of carrying out the same, I desire it to be distinctly understood that the same may be varied in many particulars without departing from my invention, and I do not therefore desire to be limited to the steps thus detailed, but What I desire to claim and secure by Letters Patent is—

1. In the art of obtaining the lactyl-derivatives of paraphenetidin, the process which consists in heating the lactate of paraphenetidin until all the water resulting from the heating and the resulting decomposition of the lactate has been separated, substantially as described.

2. The process of obtaining a lactyl derivative of paraphenetidin, which consists in heating the lactate of paraphenetidin obtained by any suitable method to 180° centigrade, and continuing the heating until all the water resulting from the heating and the resulting decomposition of the lactate has been separated, substantially as described.

3. In the art of obtaining the lactyl-derivatives of paraphenetidin, the process which consists in dissolving paraphenetidin in an acid, mixing the same with a solution of a mineral lactate, then removing the resulting mineral salt, and evaporating the residue, consisting of lactate of paraphenetidin to dryness and finally heating the same above the boiling point until no more vapors escape from the fused mass, substantially as described.

4. The process which consists in dissolving paraphenetidin in dilute sulfuric acid, then mixing the same with a solution of lactate of calcium, then precipitating the resulting sulfate of calcium by alcohol, then filtering, then evaporating the filtrate to dryness, and finally heating the residue consisting of lactate of paraphenetidin above the boiling point until no more vapors escape from the fused mass.

5. As a new compound, lactyl-para-phenetidid, having the formula $C_{11}H_{15}NO_3$ whose melting point is 117.5° centigrade, which crystallizes in white needles and is soluble in two hundred and fifty-five parts of water at 30° centigrade and four hundred and thirty-five parts of water at 20° centigrade, and very soluble in alcohol.

In testimony whereof I affix my signature in presence of two witnesses.

FRIEDRICH GEROMONT.

Witnesses:
AUGUST ROTHER,
ALVESTO S. HOGUE.